(12) United States Patent
Hart et al.

(10) Patent No.: US 8,932,174 B2
(45) Date of Patent: *Jan. 13, 2015

(54) CLUTCH AND GEAR ARRANGEMENT FOR A REAR WHEEL DRIVE VEHICLE

(75) Inventors: James M. Hart, Belleville, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 239 days.

This patent is subject to a terminal disclaimer.

(21) Appl. No.: 13/359,963

(22) Filed: Jan. 27, 2012

(65) Prior Publication Data

US 2012/0214637 A1 Aug. 23, 2012

Related U.S. Application Data

(60) Provisional application No. 61/444,059, filed on Feb. 17, 2011.

(51) Int. Cl.
*F16H 3/66* (2006.01)

(52) U.S. Cl.
USPC .......................................... 475/280; 475/290

(58) Field of Classification Search
USPC .................. 475/271–292, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,547,688 B2 * | 4/2003 | Takagi et al. | 475/276 |
| 6,913,556 B2 * | 7/2005 | Armstrong et al. | 475/269 |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 8,602,934 B2 * | 12/2013 | Mellet et al. | 475/5 |
| 2012/0178572 A1 * | 7/2012 | Hart | 475/116 |
| 2012/0178578 A1 * | 7/2012 | Mellet et al. | 475/254 |
| 2012/0178581 A1 * | 7/2012 | Wittkopp et al. | 475/275 |
| 2012/0178582 A1 * | 7/2012 | Wittkopp et al. | 475/276 |
| 2012/0214632 A1 * | 8/2012 | Mellet et al. | 475/5 |
| 2012/0214634 A1 * | 8/2012 | Mellet et al. | 475/149 |
| 2012/0214635 A1 * | 8/2012 | Mellet et al. | 475/276 |
| 2012/0214636 A1 * | 8/2012 | Hart et al. | 475/276 |
| 2012/0214638 A1 * | 8/2012 | Hart et al. | 475/276 |
| 2013/0053207 A1 * | 2/2013 | Wilton et al. | 475/276 |

* cited by examiner

*Primary Examiner* — Roger Pang

(57) ABSTRACT

A rear wheel drive transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing. Each of the clutches and brakes are located within specific areas defined by the planetary gear sets and the housing walls.

15 Claims, 6 Drawing Sheets

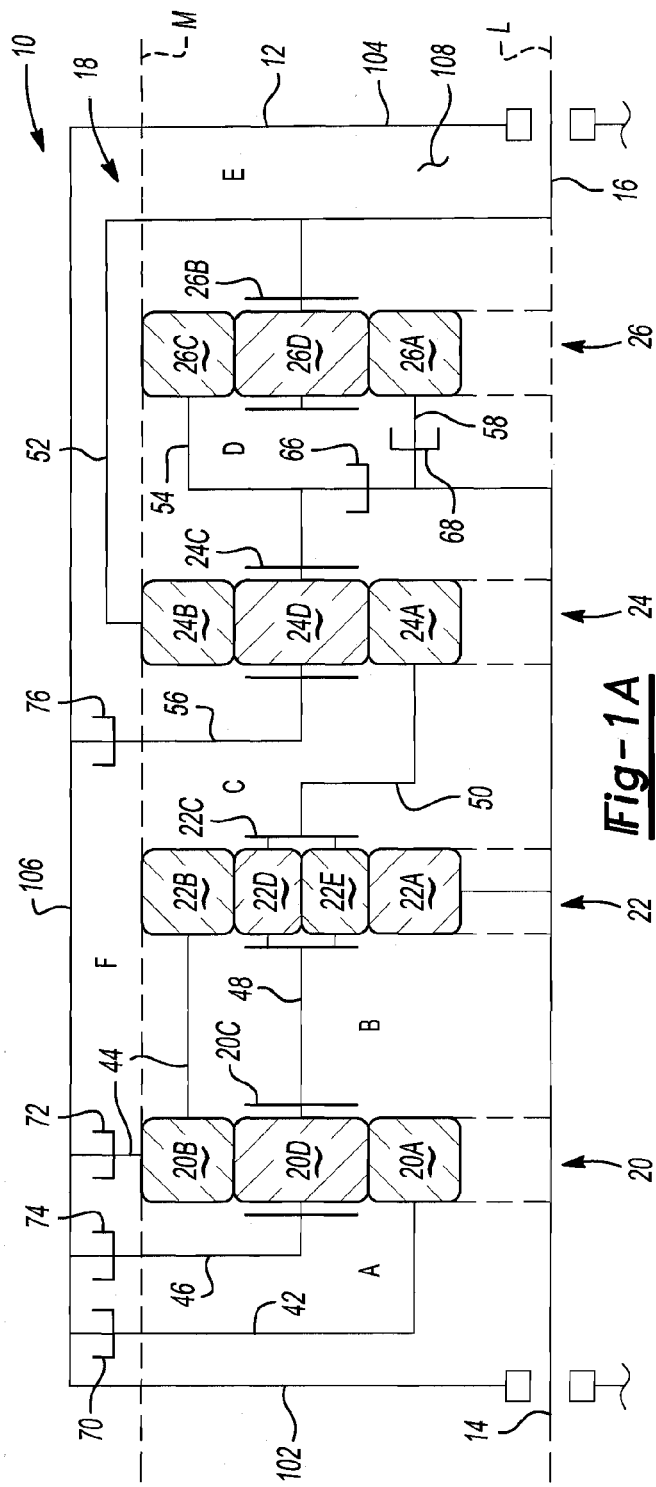

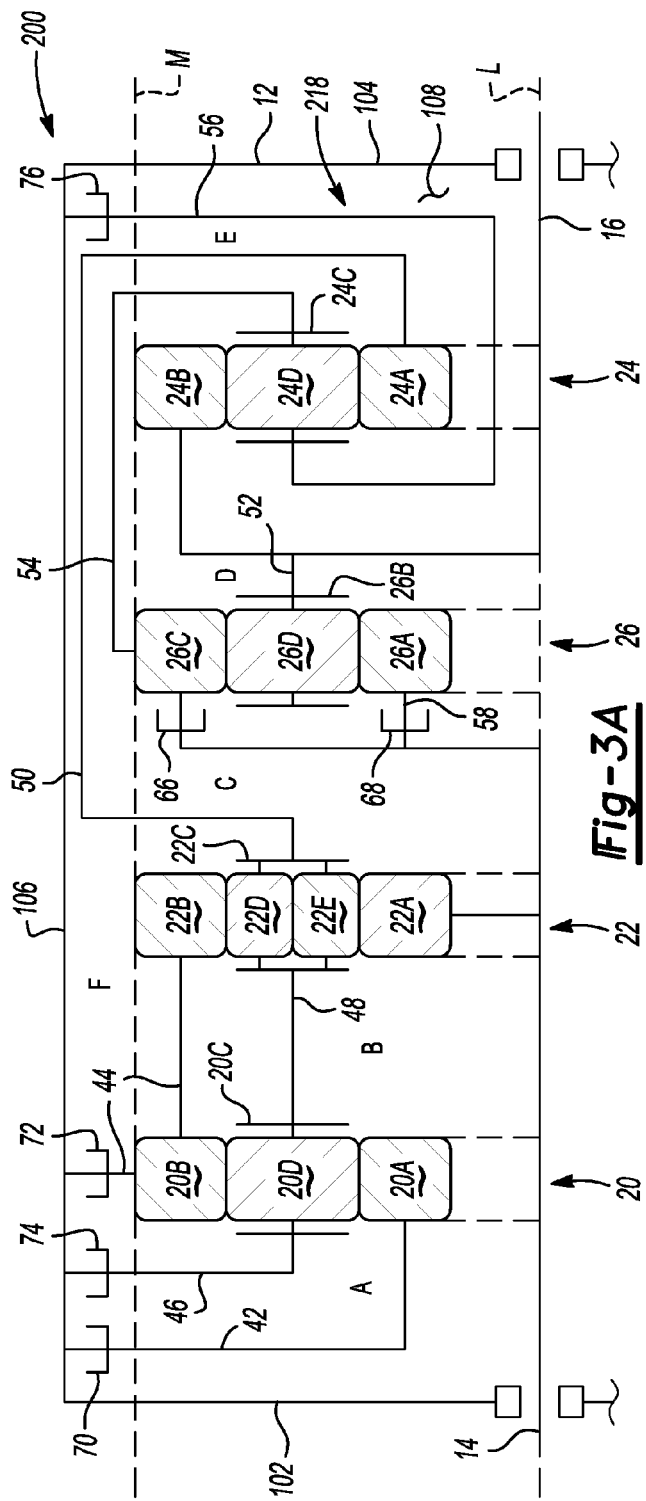

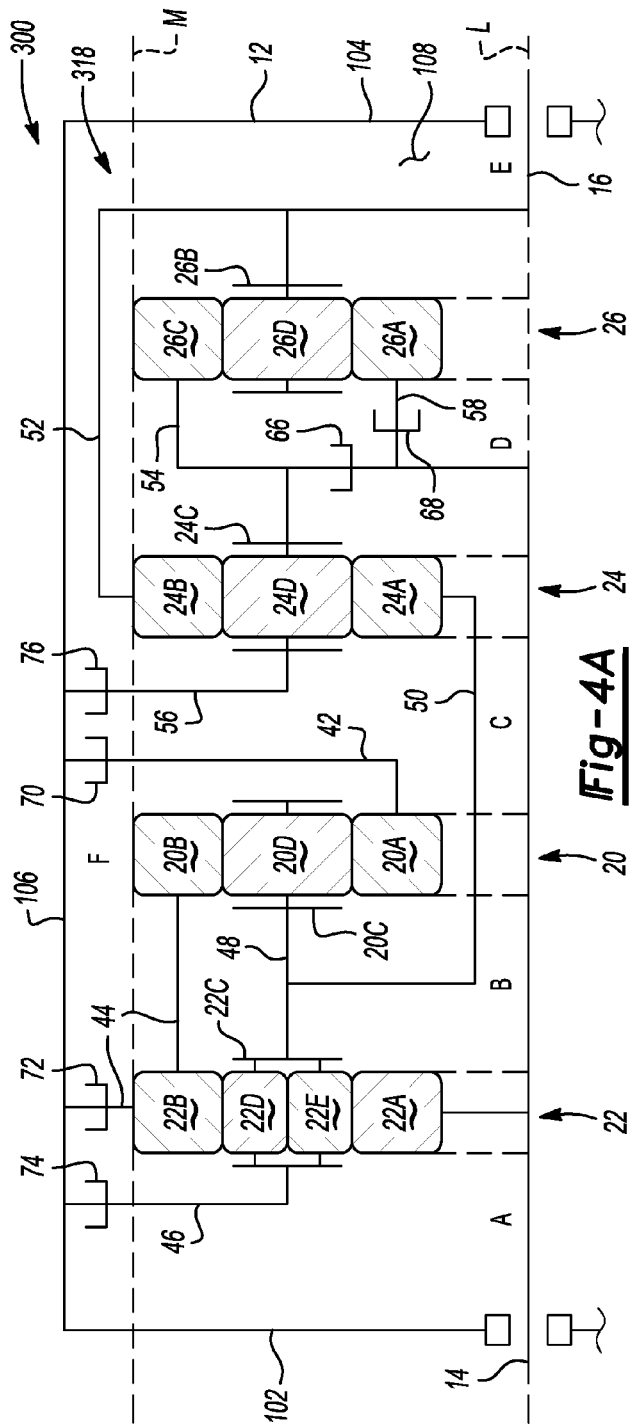

CLUTCH AND GEAR ARRANGEMENT FOR A REAR WHEEL DRIVE VEHICLE

CROSS-REFERENCE TO RELATED APPLICATIONS

This application claims the benefit of U.S. Provisional Application No. 61/444,059 filed on Feb. 17, 2011. The disclosure of the above application is incorporated herein by reference.

FIELD

The invention relates generally to a multiple speed transmission having a plurality of planetary gear sets and a plurality of torque transmitting devices and more particularly to a transmission configured for a rear wheel drive vehicle having nine or more speeds, six torque transmitting devices, and four planetary gear sets.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

In one aspect of the present invention, a transaxle is provided having transmission input member, a transmission output member, a plurality of planetary gear sets, and a plurality of torque-transmitting mechanisms.

In another aspect of the present invention, the transmission includes a housing having a first wall, a second wall, and a third wall extending between the first and second walls. First, second, third and fourth planetary gear sets are disposed within the housing. Each planetary gear set includes a sun gear member, a ring gear member, and a planet carrier member supporting a plurality of planet gears each configured to intermesh with both the sun gear member and the ring gear member.

In another aspect of the present invention, the torque-transmitting mechanisms are disposed within a plurality of areas or zones. The zones are defined by the transmission housing and the planetary gear sets.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A is a schematic diagram of a gear arrangement for a rear wheel drive transmission according to the principles of the present invention;

FIG. 1B is a chart showing the locations of the torque transmitting devices for the arrangement of planetary gear sets of the transmission shown in FIG. 1A, in accordance with the embodiments of the present invention;

FIG. 3A is another schematic diagram of a gear arrangement for a rear wheel drive transmission according to the principles of the present invention;

FIG. 3B is a chart showing the locations of the torque transmitting devices for the arrangement of planetary gear sets of the transmission shown in FIG. 3A, in accordance with the embodiments of the present invention, FIG. 4A is another schematic diagram of a gear arrangement for a rear wheel drive transmission according to the principles of the present invention;

FIG. 4B is a chart showing the locations of the torque transmitting devices for the arrangement of planetary gear sets of the transmission shown in FIG. 4A, in accordance with the embodiments of the present invention.

Figures 5A, 5B:
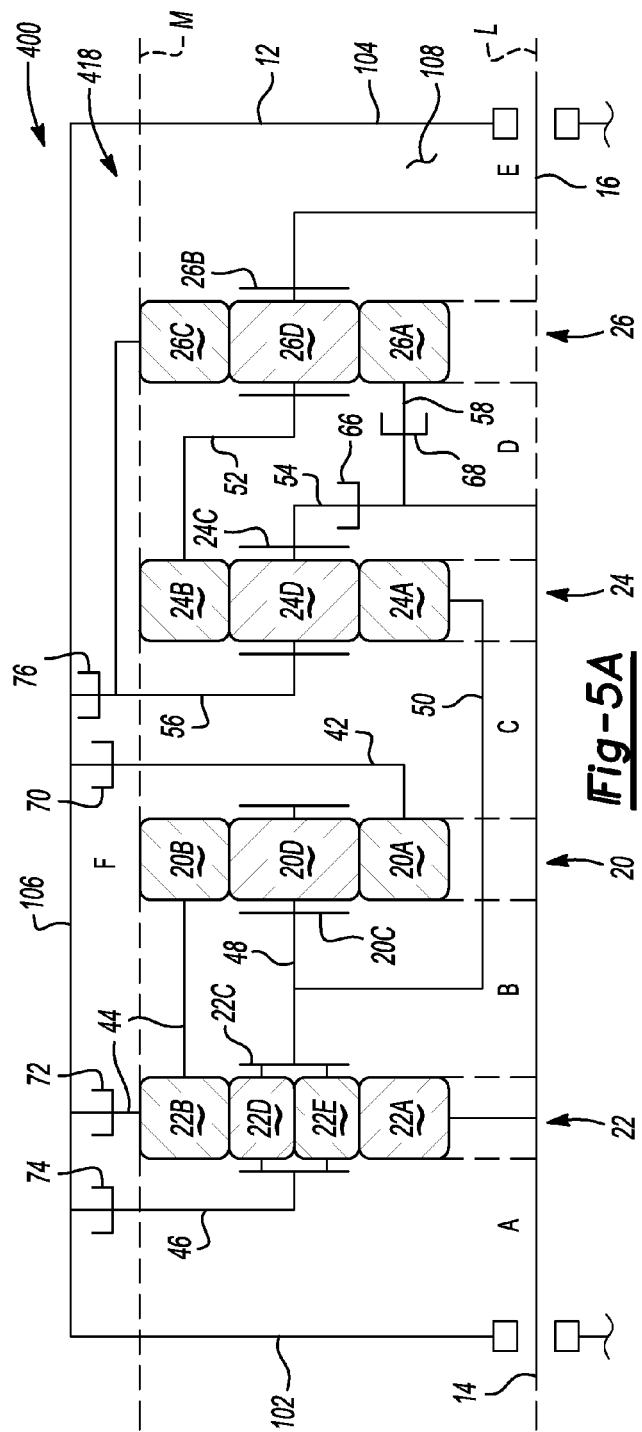
FIG. 5A is another schematic diagram of a gear arrangement for a rear wheel drive transmission according to the principles of the present invention.
Figures 6A, 6B:
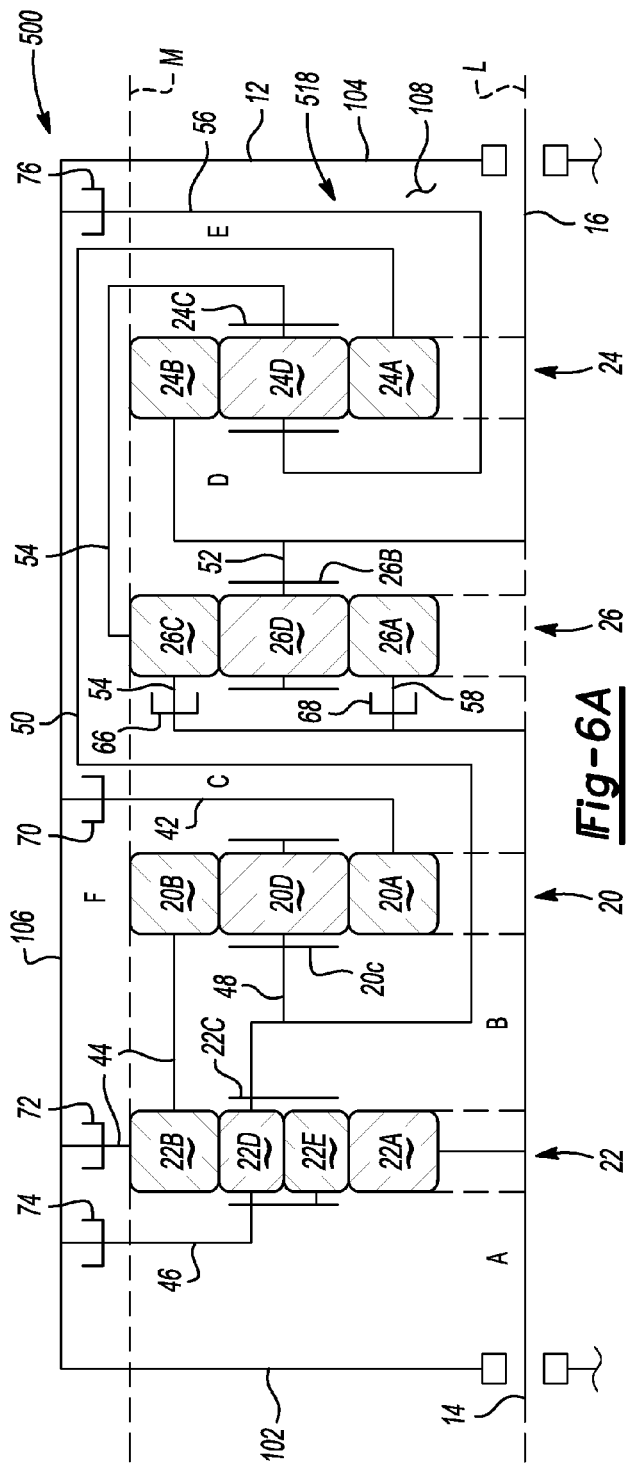

FIG. 5B is a chart showing the locations of the torque transmitting devices for the arrangement of planetary gear sets of the transmission shown in FIG. 5A, in accordance with the embodiments of the present invention, FIG. 6A is another schematic diagram of a gear arrangement for a rear wheel drive transmission according to the principles of the present invention; and FIG. 6B is a chart showing the locations of the torque transmitting devices for the arrangement of planetary gear sets of the transmission shown in FIG. 6A, in accordance with the embodiments of the present invention.

DETAILED DESCRIPTION

The following description is merely exemplary in nature and is not intended to limit the present disclosure, application, or uses.

Referring now to FIG. 1A, an embodiment of a rear wheel drive multi-speed or nine speed transmission is generally indicated by reference number 10. The transmission 10 is illustrated as a rear wheel drive transmission, though various other types of transmission configurations may be employed. The transmission 10 includes a transmission housing 12, an input shaft or member 14, an output shaft or member 16 and a gear arrangement 18. The input member 14 is continuously connected to an engine (not shown) or to a turbine of a torque converter (not shown). The output member 16 is continuously connected with a final drive unit (not shown) or transfer case (not shown).

The gear arrangement 18 of transmission 10 includes a first planetary gear set 20, a second planetary gear set 22, a third planetary gear set 24, and a fourth planetary gear set 26. The planetary gear sets 20, 22, 24 and 26 are connected between the input member 14 and the output member 16.

In an embodiment of the present invention, the first planetary gear set 20 includes a sun gear member 20A, a planet gear carrier member 20C and a ring gear member 20B. The sun gear member 20A is connected for common rotation with a first shaft or interconnecting member 42. The ring gear member 20B is connected for common rotation with a second shaft or interconnecting member 44. The planet gear carrier member 20C rotatably supports a set of planet gears 20D (only one of which is shown) and is connected for common rotation with a third shaft or interconnecting member 46 and a fourth shaft or interconnecting member 48. The planet gears 20D are each configured to intermesh with both the sun gear member 20A and the ring gear member 20B.

The second planetary gear set 22 includes a sun gear member 22A, a planet carrier member 22C that rotatably supports a set of planet gears 22D and 22E, and a ring gear member 22B. The sun gear member 22A is connected for common rotation with the input member 14. The ring gear member 22B is connected for common rotation with the second shaft or interconnecting member 44. It should be appreciated that the ring gear member 22B and the ring gear member 20B may be combined into a single long ring gear without departing from the scope of the present invention. The planet carrier member 22C is connected for common rotation with the fourth shaft or interconnecting member 48 and a fifth shaft or interconnecting member 50. The planet gears 22D are each configured to intermesh with both the ring gear member 22B and the planet gears 22E. The planet gears 22E are each configured to intermesh with both the planet gears 22D and the sun gear 22A.

The third planetary gear set 24 includes a sun gear member 24A, a ring gear member 24B and a planet carrier member 24C that rotatably supports a set of planet gears 24D. The sun gear member 24A is connected for common rotation with the fifth interconnecting member 50. The ring gear member 24B is connected for common rotation with a sixth shaft or interconnecting member 52 and the output member 16. The planet carrier member 24C is connected for common rotation with a seventh shaft or interconnecting member 54 and with an eighth shaft or interconnecting member 56. The planet gears 24D are each configured to intermesh with both the sun gear member 24A and the ring gear member 24B.

The fourth planetary gear set 26 includes a sun gear member 26A, a ring gear member 26C and a planet carrier member 26B that rotatably supports a set of planet gears 26D. The sun gear member 26A is connected for common rotation with a ninth shaft or interconnecting member 58. The ring gear member 26C is connected for common rotation with the seventh interconnecting member 54. The planet carrier member 26B is connected for common rotation with the sixth interconnecting member 52 and with the output member 16. The planet gears 26D are each configured to intermesh with both the sun gear member 26A and the ring gear member 26C.

The input shaft or member 14 is preferably continuously connected to an engine (not shown) or to a turbine of a torque converter (not shown). The output shaft or member 16 is preferably continuously connected with the final drive unit or transfer case (not shown).

The torque-transmitting mechanisms or clutches 66, 68 and brakes 70, 72, 74, 76 allow for selective interconnection of the shafts or interconnecting members, members of the planetary gear sets and the housing. For example, the first clutch 66 is selectively engageable to connect the seventh interconnecting member 54 with the input member 14. The second clutch 68 is selectively engageable to connect the ninth interconnecting member 58 with the input member 14. The first brake 70 is selectively engageable to connect the first interconnecting member 42 to the stationary member or transmission housing 40 in order to restrict the sun gear member 20A of the first planetary gear set 20 from rotating relative to the stationary member or transmission housing 40. The second brake 72 is selectively engageable to connect the second interconnecting member 44 to the stationary member or transmission housing 40 in order to restrict the ring gear member 20B of the first planetary gear set 20 and the ring gear member 22B of the second planetary gear set 22 from rotating relative to the stationary member or transmission housing 40. The third brake 74 is selectively engageable to connect the third interconnecting member 46 to the stationary member or transmission housing 40 in order to restrict the planet carrier member 20C of the first planetary gear set 20, the planet carrier member 22C of the second planetary gear set 22, and the sun gear 24A of the third planetary gear set 24 from rotating relative to the stationary member or transmission housing 40. The fourth brake 76 is selectively engageable to connect the eighth interconnecting member 56 to the stationary member or transmission housing 40 in order to restrict the planet carrier member 24C of the third planetary gear set 24 and the ring gear member 26C of the fourth planetary gear set 26 from rotating relative to the stationary element or transmission housing 40.

The transmission 10 is capable of transmitting torque from the input shaft or member 14 to the output shaft or member 16 in at least nine forward torque ratios and one reverse torque ratio. Each of the forward torque ratios and the reverse torque ratio are attained by engagement of one or more of the torque-transmitting mechanisms (i.e. first clutch 66, second clutch 68, first brake 70, second brake 72, third brake 74, and fourth brake 76). Those skilled in the art will readily understand that a different speed ratio is associated with each torque ratio. Thus, nine forward speed ratios may be attained by the transmission 10.

The transmission housing 12 includes a first wall or structural member 102, a second wall or structural member 104 and a third wall or structural member 106. The first wall 102 interconnects the second and third walls 104 and 106 to define a space or cavity 108. The input shaft 14 enters the transmission housing 12 through the first wall 102 and the output shaft 16 exits the transmission housing 12 through the second wall 104. The planetary gear sets 20, 22, 24 and 26 and the torque-transmitting mechanisms 66, 68, 70, 72, 74, and 76 are disposed within cavity 108. Further, the cavity 108 has a plurality of areas or zones A, B, C, D, E, and F in which the plurality of torque transmitting mechanisms 66, 68, 70, 72, 74, and 76 will be specifically positioned or mounted, in accordance with the preferred embodiments of the present invention.

As shown in FIG. 1A, zone A is defined by the area or space bounded by: the first wall 102, planetary gear set 20, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 20, the planetary gear set 22, radially outward by reference line "M", and radially inward by reference line "L". Zone C is defined by the area bounded by: the planetary gear set 22, the planetary gear set 24, radially outward by reference line "M", and radially inward by reference line "L". Zone D is defined by the area bounded by: the planetary gear set 24, the planetary gear set 26, radially outward by reference line "M", and radially inward by reference line "L". Zone E is defined by the area bounded by: the planetary gear set 26, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 18 of transmission 10 shown in FIG. 1A, the planetary gear set 20 is disposed closest to the first wall 102, the planetary gear set 26 is disposed closest to the second wall 104, the planetary gear set 22 is disposed adjacent the planetary gear set 20, and the planetary gear set 24 is disposed between the planetary gear sets 22 and 26. The torque-transmitting mechanisms are intentionally located within specific Zones in order to provide advantages in overall transmission size, packaging efficiency, and reduced manufacturing complexity. In the particular example shown in FIG. 1A, the first clutch 66 and the second clutch 68 are located in Zone D and the first brake 70, the second brake 72, the third brake 74, and the fourth brake 76 are all disposed within Zone F.

However, the present invention contemplates other embodiments where the torque-transmitting mechanisms 66, 68, 70, 72, 74, and 76 are disposed in the other Zones. The feasible locations of the torque-transmitting mechanisms 66, 68, 70, 72, 74, and 76 within the Zones are illustrated in the chart shown in FIG. 1B. The chart of FIG. 1B lists clutches and brakes in the left most column and the available Zones to locate the clutch/brake in the top row. An "X" in the chart indicates that the present invention contemplates locating the clutch or brake in the Zone listed in the top row. For example, first clutch 66 may be located in Zones A, B, C, or D.

Figures 2A, 2B:
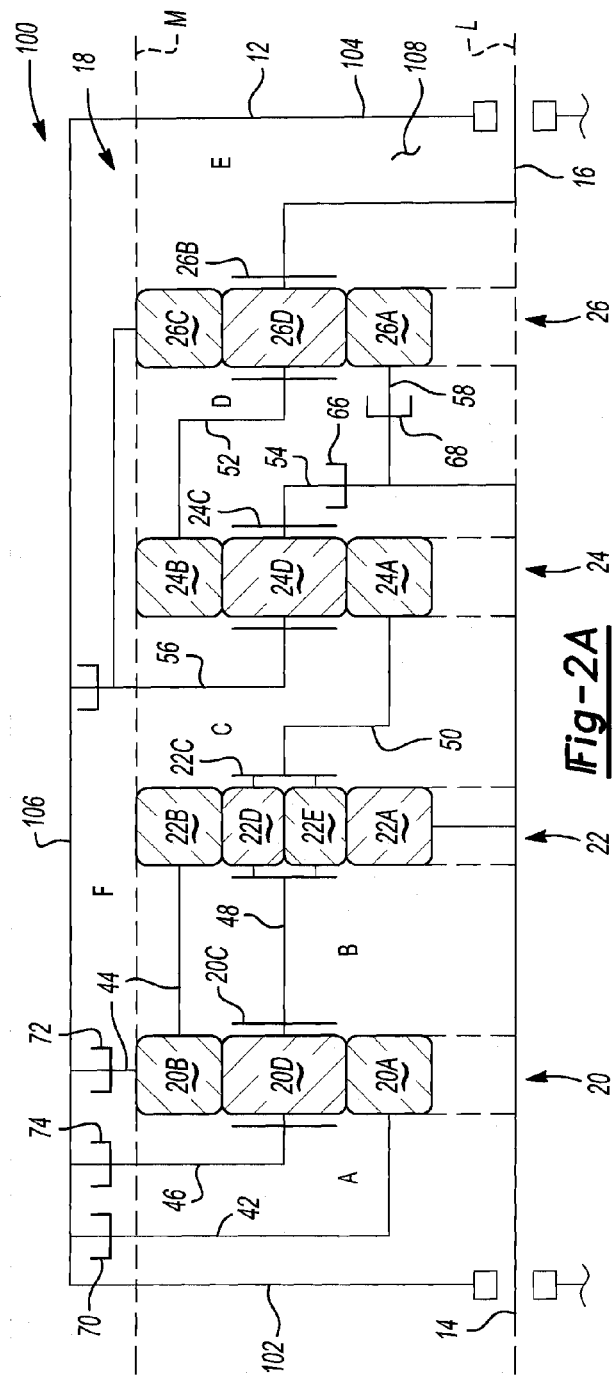
FIG. 2A is another schematic diagram of a gear arrangement for a rear wheel drive transmission according to the principles of the present invention.
FIG. 2B is a chart showing the locations of the torque transmitting devices for the arrangement of planetary gear sets of the transmission shown in FIG. 2A, in accordance with the embodiments of the present invention.

Referring now to FIG. 2A, another embodiment of a transmission is generally indicated by reference number 100. The transmission 100 is similar to transmission 10 and like components are indicated by like reference numbers. However, as shown in FIG. 2A, member 56 has extended to connect directly with the ring gear member 26C of the fourth planetary gear set 26 and member 54 no longer directly connects with the ring gear member 26C of the fourth planetary gear set 26.

The torque-transmitting mechanisms are intentionally located within specific Zones in order to provide advantages in overall transmission size, packaging efficiency, and reduced manufacturing complexity. In the particular example shown in FIG. 2A, the first clutch 66 and the second clutch 68 are located in Zone D and the first brake 70, the second brake 72, the third brake 74, and the fourth brake 76 are all disposed within Zone F.

However, the present invention contemplates other embodiments where the torque-transmitting mechanisms 66, 68, 70, 72, 74 and 76 are disposed in the other Zones. The feasible locations of the torque-transmitting mechanisms 66, 68, 70, 72, 74, and 76 within the Zones are illustrated in the chart shown in FIG. 2B. The chart of FIG. 2B lists clutches and brakes in the left most column and the available Zones to locate the clutch/brake in the top row. An "X" in the chart indicates that the present invention contemplates locating the clutch or brake in the zone listed in the top row. For example, the first clutch 66 may be located in Zones A, B, C, or D.

Referring now to FIG. 3A, another embodiment of a transmission is generally indicated by reference number 200. The transmission 200 is similar to transmission 10 and like components are indicated by like reference numbers. However, as shown in FIG. 3A, Zone A is defined by the area or space bounded by: the first wall 102, planetary gear set 20, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 20, the planetary gear set 22, radially outward by reference line "M", and radially inward by reference line "L". Zone C is defined by the area bounded by: the planetary gear set 22, the planetary gear set 26, radially outward by reference line "M", and radially inward by reference line "L". Zone D is defined by the area bounded by: the planetary gear set 26, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 218 of transmission 200 shown in FIG. 3A, the planetary gear set 20 is disposed closest to the first wall 102, the planetary gear set 24 is disposed closest to the second wall 104, the planetary gear set 22 is adjacent the planetary gear set 20, and the planetary gear set 26 is disposed between the planetary gear sets 22 and 24. The torque-transmitting mechanisms are intentionally located within specific Zones in order to provide advantages in overall transmission size, packaging efficiency, and reduced manufacturing complexity. In the particular example shown in FIG. 3A, the first clutch 66 and the second clutch 68 are located in Zone C and the first brake 70, the second brake 72, the third brake 74, and the fourth brake 76 are all disposed within Zone F.

However, the present invention contemplates other embodiments where the torque-transmitting mechanisms 66, 68, 70, 72, 74, and 76 are disposed in the other Zones. The feasible locations of the torque-transmitting mechanisms 66, 68, 70, 72, 74, and 76 within the Zones are illustrated in the chart shown in FIG. 3B. The chart of FIG. 3B lists clutches and brakes in the left most column and the available zones to locate the clutch/brake in the top row. An "X" in the chart indicates that the present invention contemplates locating the clutch or brake in the zone listed in the top row. For example, the first brake 66 may be located in Zones A, B, or C.

Referring now to FIG. 4A, another embodiment of a transmission is generally indicated by reference number 300. The transmission 300 is similar to transmission 10 and like components are indicated by like reference numbers. However, as shown in FIG. 4A, Zone A is defined by the area or space bounded by: the first wall 102, planetary gear set 22, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 22, the planetary gear set 20, radially outward by reference line "M", and radially inward by reference line "L". Zone C is defined by the area bounded by: the planetary gear set 20, the planetary gear set 24, radially outward by reference line "M", and radially inward by reference line "L". Zone D is defined by the area bounded by: the planetary gear set 24, the planetary gear set 26, radially outward by reference line "M", and radially inward by reference line "L". Zone E is defined by the area bounded by: the planetary gear set 26, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 318 of transmission 300 shown in FIG. 4A, the planetary gear set 22 is disposed closest to the first wall 102, the planetary gear set 26 is disposed closest to the second wall 104, the planetary gear set 20 is adjacent the planetary gear set 22, and the planetary gear set 24 is disposed between the planetary gear sets 20 and 26. The torque-transmitting mechanisms are intentionally located within specific Zones in order to provide advantages in overall transmission size, packaging efficiency, and reduced manufacturing complexity. In the particular example shown in FIG. 4A, the first clutch 66 and the second clutch 68 are located in Zone D and the first brake 70, the second brake 72, the third brake 74, and the fourth brake 76 are all disposed within Zone F.

However, the present invention contemplates other embodiments where the torque-transmitting mechanisms 66, 68, 70, 72, 74, and 76 are disposed in the other Zones. The feasible locations of the torque-transmitting mechanisms 66, 68, 70, 72, 74, and 76 within the Zones are illustrated in the chart shown in FIG. 4B. The chart of FIG. 4B lists clutches and brakes in the left most column and the available zones to locate the clutch/brake in the top row. An "X" in the chart indicates that the present invention contemplates locating the clutch or brake in the zone listed in the top row. For example, the first brake 66 may be located in Zones A, B, C, or D.

Referring now to FIG. 5A, another embodiment of a transmission is generally indicated by reference number 400. The transmission 400 is similar to transmission 300 and like components are indicated by like reference numbers. However, as shown in FIG. 5A, member 56 has extended to connect directly with the ring gear member 26C of the fourth planetary gear set 26 and member 54 no longer directly connects with the ring gear member 26C of the fourth planetary gear set 26.

The torque-transmitting mechanisms are intentionally located within specific Zones in order to provide advantages in overall transmission size, packaging efficiency, and reduced manufacturing complexity. In the particular example shown in FIG. 5A, the first clutch 66 and the second clutch 68 are located in Zone D and the first brake 70, the second brake 72, the third brake 74, and the fourth brake 76 are all disposed within Zone F.

However, the present invention contemplates other embodiments where the torque-transmitting mechanisms 66, 68, 70, 72, 74 and 76 are disposed in the other Zones. The feasible locations of the torque-transmitting mechanisms 66, 68, 70, 72, 74, and 76 within the Zones are illustrated in the chart shown in FIG. 5B. The chart of FIG. 5B lists clutches and brakes in the left most column and the available Zones to locate the clutch/brake in the top row. An "X" in the chart indicates that the present invention contemplates locating the clutch or brake in the zone listed in the top row. For example, the first clutch 66 may be located in Zones A, B, C, or D.

Referring now to FIG. 6A, another embodiment of a transmission is generally indicated by reference number 500. The transmission 500 is similar to transmission 10 and like components are indicated by like reference numbers. However, as shown in FIG. 6A, Zone A is defined by the area or space bounded by: the first wall 102, planetary gear set 22, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 22, the planetary gear set 20, radially outward by reference line "M", and radially inward by reference line "L". Zone C is defined by the area bounded by: the planetary gear set 20, the planetary gear set 26, radially outward by reference line "M", and radially inward by reference line "L". Zone D is defined by the area bounded by: the planetary gear set 26, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 518 of transmission 500 shown in FIG. 6A, the planetary gear set 22 is disposed closest to the first wall 102, the planetary gear set 24 is disposed closest to the second wall 104, the planetary gear set 20 is adjacent the planetary gear set 22, and the planetary gear set 26 is disposed between the planetary gear sets 20 and 24. The torque-transmitting mechanisms are intentionally located within specific Zones in order to provide advantages in overall transmission size, packaging efficiency, and reduced manufacturing complexity. In the particular example shown in FIG. 6A, the first clutch 66 and the second clutch 68 are located in Zone C and the first brake 70, the second brake 72, the third brake 74, and the fourth brake 76 are all disposed within Zone F.

However, the present invention contemplates other embodiments where the torque-transmitting mechanisms 66, 68, 70, 72, 74, and 76 are disposed in the other Zones. The feasible locations of the torque-transmitting mechanisms 66, 68, 70, 72, 74, and 76 within the Zones are illustrated in the chart shown in FIG. 6B. The chart of FIG. 6B lists clutches and brakes in the left most column and the available zones to locate the clutch/brake in the top row. An "X" in the chart indicates that the present invention contemplates locating the clutch or brake in the zone listed in the top row. For example, the first brake 66 may be located in Zones A, B, or C.

The description of the invention is merely exemplary in nature and variations that do not depart from the gist of the invention are intended to be within the scope of the invention. Such variations are not to be regarded as a departure from the spirit and scope of the invention.

What is claimed is:
1. An automatic transmission comprising:
an input member;
an output member;

a transmission housing having a first wall, a second wall and a third wall extending between the first and the second walls;

a first, a second, a third and a fourth planetary gear assembly disposed within the transmission housing, wherein the first planetary gear assembly is adjacent the first wall, the second planetary gear assembly is adjacent the first planetary gear assembly, the third planetary gear assembly is adjacent the second planetary gear assembly, and the fourth planetary gear assembly is between the third planetary gear assembly and the second wall, each of the planetary gear assemblies including a sun gear, a ring gear and a planet carrier member supporting a plurality of planet gears, wherein the input member is coupled to the sun gear of the second planetary gear assembly, the output member is coupled to the planet carrier of the fourth planetary gear assembly and the ring gear of the third planetary gear assembly, the ring gear of the first planetary gear assembly is coupled to the ring gear of the second planetary gear assembly, the planet carrier member of the first planetary gear assembly is coupled to the planet carrier member of the second planetary gear assembly, the planet carrier member of the second planetary gear assembly is coupled to the sun gear of the third planetary gear assembly, and the planet carrier member of the third planetary gear assembly is coupled to the ring gear of the fourth planetary gear assembly, wherein the transmission housing has a first area radially inward from an outer periphery of the planetary gear assemblies and axially bounded by the first wall and the first planetary gear assembly, a second area radially inward from the outer periphery of the planetary gear assemblies and axially bounded by the first and the second planetary gear assemblies, a third area radially inward from the outer periphery of the planetary gear assemblies and axially bounded by the second and the third planetary gear assemblies, a fourth area radially inward from the outer periphery of the planetary gear assemblies and axially bounded by the third and the fourth planetary gear assemblies, a fifth area radially inward from the outer periphery of the planetary gear assemblies and axially bounded by the fourth planetary gear assembly and the second wall, and a sixth area between the outer periphery of the planetary gear assemblies and the third wall and axially bounded by the first wall and the second wall;

a first clutch selectively engageable between the input member and the ring gear of the fourth planetary gear assembly;

a second clutch selectively engageable between the input member and the sun gear of the fourth planetary gear assembly;

a first brake selectively engageable between the sun gear of the first planetary gear assembly and the transmission housing;

a second brake selectively engageable between the ring gear of the first planetary gear assembly and the transmission housing;

a third brake selectively engageable between the planet carrier member of the first planetary gear assembly and the transmission housing; and a fourth brake selectively engageable between the planet carrier member of the third planetary gear assembly and the transmission housing, and wherein the first clutch is located in one of the first, second, third, and fourth areas, the second clutch is located in one of the first, second, third, and fourth areas, the first brake is located in one of the first, second, and sixth areas, the second brake is located in one of the first, second, third, and sixth areas, the third brake is located in one of the first, second, third, and sixth areas, and the fourth brake is located in one of the third, fourth, fifth, and sixth areas, and wherein the clutches and brakes are selectively engageable to establish at least nine forward speed ratios and one reverse speed ratio between the input member and the output member.

2. The automatic transmission of claim 1 wherein the first and second clutches are located in the fourth area and the first, second, third, and fourth brakes are located in the sixth area.

3. The automatic transmission of claim 1 wherein the output member is disposed at least partially radially outward of the fourth planetary gear assembly.

4. The automatic transmission of claim 1 wherein the input member is partially disposed through the first wall and the output member is partially disposed through the second wall.

5. The automatic transmission of claim 1 wherein at least one of the first clutch, the second clutch, the first brake, the second brake, and the third brake is located in the first area.

6. The automatic transmission of claim 1 wherein at least one of the first clutch, the second clutch, the first brake, the second brake, and the third brake is located in the second area.

7. The automatic transmission of claim 1 wherein at least one of the first clutch, the second clutch, the second brake, the third brake, and the fourth brake is located in the third area.

8. The automatic transmission of claim 1 wherein at least one of the first clutch, the second clutch, and the fourth brake is located in the fourth area.

9. The automatic transmission of claim 1 wherein the fourth brake is located in the fifth area.

10. The automatic transmission of claim 1 wherein at least one of the first, second, third, and fourth brake is located in the sixth area.

11. The automatic transmission of claim 1 wherein the first, the third, and the fourth planetary gear assemblies are simple and the second planetary gear assembly is compound.

12. An automatic transmission comprising:
an input member;
an output member;
a transmission housing having a first wall, a second wall and a third wall extending between the first and the second walls;
a first, a second, a third and a fourth planetary gear assembly disposed within the transmission housing and rotatable about an axis, wherein the first planetary gear assembly is adjacent the first wall, the second planetary gear assembly is adjacent the first planetary gear assembly, the third planetary gear assembly is adjacent the second planetary gear assembly, and the fourth planetary gear assembly is between the third planetary gear assembly and the second wall, each of the planetary gear assemblies including a sun gear, a ring gear and a planet carrier member supporting a plurality of planet gears,
wherein the sun gear of the second planetary gear assembly is continuously connected to the input member and the planet carrier member of the fourth planetary gear assembly is continuously connected to the output member;
a first interconnecting member continuously connecting the ring gear of the first planetary gear assembly with the ring gear of the second planetary gear assembly, wherein the first interconnecting member is at least partially disposed axially between the first and second planetary gear assemblies;

a second interconnecting member continuously connecting the planet carrier member of the first planetary gear set with the planet carrier member of the second planetary gear set, wherein the second interconnecting member is disposed radially inward of the first interconnecting member;

a third interconnecting member continuously connecting the planet carrier member of the second planetary gear assembly with the sun gear of the third planetary gear assembly, wherein the third interconnecting member is disposed between the second and third planetary gear assemblies radially outward of the input member;

a fourth interconnecting member continuously connecting the ring gear of the third planetary gear assembly with the planet carrier of the fourth planetary gear assembly and the output member, wherein the fourth interconnecting member is at least partially disposed radially outward of the fourth planetary gear assembly;

a fifth interconnecting member continuously connecting the planet carrier member of the third planetary gear assembly with the ring gear of the fourth planetary gear assembly, wherein the fifth interconnecting member is disposed radially inward of the fourth interconnecting member and radially outward of the input member;

a first clutch selectively engageable between the input member and the ring gear of the fourth planetary gear assembly;

a second clutch selectively engageable between the input member and the sun gear of the fourth planetary gear assembly;

a first brake selectively engageable between the sun gear of the first planetary gear assembly and the transmission housing;

a second brake selectively engageable between the ring gear of the first planetary gear assembly and the transmission housing;

a third brake selectively engageable between the planet carrier member of the first planetary gear assembly and the transmission housing; and a fourth brake selectively engageable between the planet carrier member of the third planetary gear assembly and the transmission housing, and wherein the clutches and brakes are selectively engageable to establish at least nine forward speed ratios and one reverse speed ratio between the input member and the output member.

13. The automatic transmission of claim 12 wherein the first clutch is disposed radially inward of the fourth interconnecting member and radially outward of the input member.

14. The automatic transmission of claim 13 wherein the second clutch is disposed radially inward of the fourth interconnecting member and radially outward of the input member.

15. The automatic transmission of claim 12 wherein the first, the third, and the fourth planetary gear assemblies are simple and the second planetary gear assembly is compound.

* * * * *